(12) United States Patent
Monahan et al.

(10) Patent No.: US 6,394,248 B1
(45) Date of Patent: May 28, 2002

(54) COMPRESSION SPRING COMPLAINT ONE-WAY OVER-RUNNING CLUTCH PULLEY

(75) Inventors: Russell E. Monahan, Ann Arbor; Robert Frayer, Gregory; Jonathan M. Adler, Dexter; Thomas W. Houtman, Ann Arbor; Randall K. King, Southfield, all of MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/583,844

(22) Filed: May 31, 2000

(51) Int. Cl.[7] .............................. F16D 41/20; F16D 3/66
(52) U.S. Cl. ................. 192/41 S; 192/55.61; 192/81 C
(58) Field of Search ........................... 192/41 R, 41 S, 192/81 C, 55.61

(56) References Cited

U.S. PATENT DOCUMENTS

| | | |
|---|---|---|
| 2,230,293 A | 2/1941 | Harris |
| 2,694,937 A | 11/1954 | Birbaum |
| 2,809,535 A | 10/1957 | Hein et al. |
| 2,866,349 A | 12/1958 | Heckethorn |
| 3,618,730 A | 11/1971 | Mould, III |
| 3,759,111 A | 9/1973 | Hoff |
| 3,884,089 A | 5/1975 | Avramidis |
| 3,965,768 A | 6/1976 | Foster |
| 4,031,761 A | 6/1977 | Fisher et al. |
| 4,392,840 A | 7/1983 | Radocaj |
| 4,460,076 A | 7/1984 | Yamada |
| 4,466,522 A | 8/1984 | Shibuya |
| 4,473,362 A | 9/1984 | Thomey et al. |
| 4,613,318 A | 9/1986 | McWilliam et al. |
| 4,830,151 A | 5/1989 | Numata |
| 4,913,274 A | 4/1990 | Nishimura |
| 5,139,463 A | 8/1992 | Bytzek et al. |
| 5,156,573 A | 10/1992 | Bytzek et al. |
| 5,273,229 A | 12/1993 | Komatsu |
| 5,314,053 A | 5/1994 | Nishimura |
| 5,598,913 A | 2/1997 | Monahan et al. |
| 6,044,943 A | * 4/2000 | Bytzek et al. ............ 192/41 R |

FOREIGN PATENT DOCUMENTS

WO    WO 98/50709 A1    * 11/1998

* cited by examiner

*Primary Examiner*—Richard M. Lorence
(74) *Attorney, Agent, or Firm*—Brinks Hofer Gilson & Lione

(57) ABSTRACT

An over-running clutch pulley in which an input hub and output hub are compliantly coupled to soften the transition between the unlocked and locked state of the over-running clutch pulley.

14 Claims, 4 Drawing Sheets

COMPRESSION SPRING COMPLAINT ONE-WAY OVER-RUNNING CLUTCH PULLEY

BACKGROUND OF THE INVENTION

1. Field of the Invention

This invention generally relates to pulleys. More particularly, the present invention relates to an over-running clutch pulley which has particular application within an engine accessory system including an automotive alternator.

2. Description of the Prior Art

During operation of an engine, a belt drive system is sometimes used to power and operate the various accessory devices including, but not limited to, an alternator which provides electrical power to the vehicle. While several type of belt drive systems are in use, the system which is currently in favor is known as a serpentine drive system. Serpentine drive systems generally include a drive pulley connected to the crankshaft of the automobile's internal combustion (I.C.) engine and a ribbed belt trained about the drive pulley. The belt is also trained about one or more driven pulleys which are in turn connected to the input shafts of the various accessories. An automatic belt tensioner is also provided to maintain the tension of the belt within the proper range. Most driven pulleys are provided in a one-piece design. These pulleys have no over-running capabilities, meaning that the pulley is rigidly mounted to rotate with the accessory input shaft.

When the input shaft of the accessory device is running at high speed (up to 22,000 rpm for an alternator), a significant amount of inertia is built up within the accessory device. As a result of the combined inertia and the lack of over-running capabilities, relative slipping between the pulley and the belt can occur if the belt decelerates too quickly. If significant slipping of the belt occurs, an audible squeal will be produced. Not only is a squealing belt annoying from an auditory standpoint, but it also undesirable from a mechanical standpoint since it produces undue wear on the belt itself.

In a typical driving situation, the accessory belt will experience instances of large deceleration, such as during in a 1–2 upshift during wide-open throttle acceleration. The situation is made even worse if the throttle is closed or "backed out" immediately after the transmission has been shifted. In these situations, the belt decelerates very quickly while the pulley, with the high inertia from the accessory, keeps rotating very quickly in spite of the friction between the pulley and the belt.

Another major problem with the front end accessory drive is the torsional vibrations caused by the engine pulsations. Each cylinder in the internal combustion engine fires, a torsional pulsation is produced, causing a sinusoidal variation in the overall torque produced by the engine. In most operating conditions, the engine is rotating quickly enough that these torsional vibrations are smoothed out, and little if any vibration can be felt by the driver. The front end accessory drive is designed so that under most operating conditions, there is no resonant vibration in any part of the system, so the belt spans between the accessories usually operate smoothly with little if any vibration. However, resonant conditions can exist under certain accessory loads and engine speeds. Examples of this problem are when "lugging" or sub-idle speed is encountered in a manual transmission vehicle, or when high loads are experienced when the A/C and power steering are operating simultaneously at maximum output. During these conditions, one or more belt spans between the accessories can begin vibrating uncontrollably, producing noise, belt wear and the potential for the belt being thrown off the pulleys.

In attempting to cure the slipping and resonant vibration of the belt, and associated problems, various design proposals have been put forward. One proposed design includes the use of higher belt tensions. However, in these designs the belt tends to wear even more quickly. Additionally, the bearings associated with the input shaft of the accessory also have shown greater wear and a shortened useful life. Various other tensioner constructions have been proposed, but those tensioners have generally exhibited poor performance and were costly to implement.

Attempts to cure the belt slippage, vibration and squeal problem have also proceeded in another direction. While early driven pulleys were constructed in a one-piece design, newer pulley designs have been proposed where the driven pulley itself exhibits an "over-running" capability. This allows the driven pulley to rotate relative to the input shaft of the accessory and therefore accommodate the inertia built up within the accessory.

U.S. Pat. No. 4,725,259 issued to Miyata discloses a construction where the driven pulley is mounted to the input shaft via a one-way clutch. The clutch only engages when the angular velocity of the pulley is accelerating. Otherwise, the clutch slips relative to the input shaft of the accessory. This design is intended to smooth out the recurring fluctuations of instantaneous velocity in the belt that is typical of an I.C. engine. The design smoothes out the corresponding recurrent instantaneous slipping of the belt relative to the driven pulley. No specific constructions for the Miyata one-way clutch are given in the disclosure of this patent.

U.S. Pat. Nos. 5,139,463 and 5,156,573, issued to Butzek et al., disclose alternator pulley constructions in which a coil spring is disposed in a space between a hub attached directly to the accessory input shaft and a pulley mounted for relative movement exteriorly of the hub.

In the '463 patent, the two ends of the coil spring are respectively bent radially inward and radially outward so that one will engage the hub and the other will engage the pulley. In this patent, the spring is wound so that when a positive torque is applied from the belt to the pulley, the rotational movement of the pulley will be transferred to the input shaft of the accessory as a result of the spring "winding-up" and the tangs engaging both the hub and pulley. Whenever negative torque is provided from the belt to the pulley, the spring enables the input shaft to disengage from the accessory and the hub to rotate relative to the pulley.

In the '573 patent, the coil spring has one end bent radially outward. Additionally, the spring includes two sets of volutes, an intermediate set located between the other set and the bent end of the spring. The diameter of the hub and the inner diameter of the non-intermediate volutes are such that the volutes engage the hub when the pulley is being driven by the belt. When a negative torque is established between the alternator pulley and the input shaft, the volutes loosen with respect to the hub and allow slipping to occur. Importantly, the Butzek design of the intermediate volutes allows for a "resilient rotational motion" to ease the shock loading between the pulley and the hub but can cause fatigue problems in the spring.

U.S. Pat. No. 5,598,913 discloses a one way over-running clutch pulley in which a coil spring engages a composite cylindrical surface which is defined by both the sheave and hub. The spring is oriented so that torque is transferred from the sheave to the hub when the sheave is driving the hub. The spring allows slip to occur between these two components during deceleration of the drive belt's recurring speed and torque fluctuations.

While the clutch pulleys of these patents may operate adequately in some respects, they have drawbacks in others. First, some prior art pulleys have experienced resonant vibration problems, especially during idle and sub-idle conditions. Another problem in over-running pulleys is hard lock-up. During engine idle, the large torque fluctuations which are characteristic of the internal combustion engine are smoothed out by an over-running pulley such as the pulley disclosed in the '913 patent. During the brief periods of deceleration, the pulley over-runs. Because of its stiff nature in the drive direction, the hub would over (theoretically) rotate slower than the sheave's input speed of the alternator and pulley (or sheave and hub) are equal. Such immediate and hard lock-up can cause its own noise, vibration, wear, and fatigue durability problems.

In view of the foregoing limitations and shortcomings of the prior art devices, as well as other disadvantages not specifically mentioned above, it should be apparent that there still exists a need for an improved one-way, over-running clutch pulley.

It is therefore a primary object of this invention to fulfill that need by providing a one-way over-running clutch pulley which overcomes the limitations and shortcomings of the prior art. Such a clutch pulley would find particular applicability with the accessory drive system of an automobile where it would allow for relative slip or compliancy between the pulley sheave and hub at the onset of lock-up. It is also an object of the present invention to provide a one-way, over-running clutch pulley which accommodates large decelerations of the belt so as to reduce or eliminate the belt squeal and wear that normally occur as a result of the belt slipping relative to the pulley. With respect to the present invention, compliance is built into the pulley to provide extra dampening to move the resonant condition output of the speed range under which the vehicle could ever be expected to be operated.

An object of this invention is to provide an over-running clutch pulley which provides a gradual transition from an unlocked state to a locked state.

Another object of this invention is to provide a one-way, over-running clutch pulley incorporating a compression spring for providing the compliance in the clutch pulley.

Yet another object of the present invention is to provide an over-running clutch pulley of a compact, low cost and lightweight construction, yet which is of a durable construction.

SUMMARY OF THE INVENTION

Briefly described, these and other objects of the invention are accomplished according to the present invention by providing what is hereinafter referred to as a compression spring compliant, one-way over-running clutch pulley. The device is intended for mounting to a rotational input shaft of a device, such as the alternator of an automobile. While the clutch pulley of the present invention is being specifically discussed in connection with automotive vehicles, it will be easily seen that the present invention has general applicability in a wide range of situations, particularly where it is desirable to provide compliance between a rotational input member and an output member to eliminate belt squeal and resonant vibrations.

The clutch pulley of the present invention is engaged by a driving member, such as a belt, which is rotatably being driven. The clutch pulley has several main components including an inner pulley hub, an outer pulley sheave, a bearing and a coil spring.

The pulley hub includes an output hub through which a mounting bore is defined. The bore is sized and shaped to receive the input shaft of the driven device, such as an alternator in a vehicle accessory system. The input shaft of the driven device is mounted to the output hub so that relative rotational movement between the output hub and the input shaft is prevented. Accordingly, rotation of the output hub will cause rotation of the input shaft of the driven device, e.g. the alternator. The output hub includes projections or similar features which engage one end of series of compression springs. The other ends of the springs are engaged by projections or similar features on an input hub.

The input hub is mounted radially outboard of the output hub and can rotate relative thereto. An axial extension off of the input hub defines a first inner surface which is generally cylindrically configured and is generally coaxial with the bore of the output hub and the shaft of the accessory.

The clutch pulley also includes a pulley sheave having a first portion adapted to engage a driving member which causes rotation of the pulley sheave. A portion of the pulley sheave defines a second inner surface, which is also generally cylindrically configured. The second inner cylindrical surface has a diameter which is substantially the same as the diameter of the first inner cylindrical surface of the input hub. The first and second cylindrical surfaces are coaxial with one another and adjacently located so that they cooperate to define a common or composite inner cylindrical surface. This composite inner cylindrical surface also partially defines a spring receiving cavity.

The pulley sheave is mounted to the input hub by a support bearing which permits relative rotation between the two components. The support bearing is located between concentric portions of the pulley sheave and input hub.

Received in the spring cavity mentioned above is a wrap spring. The freestanding outer diameter of the wrap spring is slightly greater than the diameter defined by the composite inner cylindrical surface. As a result, the wrap spring is in an interference and frictional engagement with the composite inner cylindrical surface and retained by the radially outward contact normal force inherently exerted by the wrap spring. The winding of the wrap spring is oriented in a direction that compressively loads the wrap spring whenever the pulley sheave is positively driven or accelerated relative to the input hub. This action tends to unwind the wrap spring and would effectively increase its diameter if it were not restrained by the inner cylindrical surfaces of the sheave and input hub. Conversely, the diameter of the wrap spring effectively decreases when the pulley sheave is negatively driven or decelerated relative to the input hub.

The effective increase in the diameter of the wrap spring during compressive loading, positive driving and acceleration of the pulley sheave relative to the input hub causes the wrap spring to exert an increased radially outward contact normal force on the inner cylindrical surfaces of the sheave and input hub. The normal forces, which result in engagement of the wrap spring with inner cylindrical surfaces, increase exponentially along the spring helix reaching a maximum at the midpoint. Because the normal forces determine the frictional forces and therefore the torque load which can be carried by the present clutch pulley, the initial normal force caused by the interference fit between the wrap spring and composite inner cylindrical surfaces obviates the need for a tang on the wrap spring if a sufficient number of spring volutes engage both portions of the composite inner surface. With this increased normal force being applied to both the first and second inner cylindrical surfaces, these surfaces effectively become "locked" together by the wrap spring and torque is transferred from the input member (belt) to through the pulley sheave and input hub to the shaft of the driven device. Depending on the amplitude and frequency of these recurring speed and torque fluctuations , a resonant condition may be s et up in the drive belt, causing a flapping motion resulting in noise and excessive belt wear.

To eliminate the resonant condition, the present invention provides for a construction which allows a "softer" or more compliant coupling between the wrap spring and the surfaces, and therefore between the sheave and the input hub. In a preferred embodiment of the invention, compliancy is accomplished by the interaction of the input hub, the compression springs, and the output hub. During a non-locked condition, the compression springs are fully extended. As lock-up initiates, the wrap spring first exerts its increased radially outward normal force on the composite surface defined by the sheave and input hub. Because the input hub and output hub can rotate relative to one another, the input hub begins to rotate relative to the output hub. As it does the projections of the input hub move toward the projections of the output hub compressing the springs located therebetween. Depending on the torque being transmitted, the compression springs may be partially or substantially completely compressed. To prevent the compression springs from being over-compressed, the projections of the input hub, the output hub or both are provided with stops that engage the opposing projection or the stop of that projection. At engagement of the stop(s), the input and output hubs are hard locked in the driving direction.

As an alternative to the wrap spring construction mentioned above, an alternate embodiment could employ a roller ramp or sprag type one-way clutch mechanism.

By adding the compliant feature to the over-running pulley, the pulley becomes a torsional spring in the accessory drive system, affecting the frequency response characteristics of the total system.

When a deceleration or negative driving is experienced between the pulley sheave and the input hub, such as during a wide open throttle 1–2 upshift, the shaft of the driven device will not immediately respond to the deceleration because of the inertia built up within the driven device and the input hub will over-run the pulley sheave. This causes the wrap spring to unload and "wind-up", effectively decreasing the diameter of the wrap spring. Even a very slight reduction in the effective diameter of the wrap spring results in a corresponding reduction in the normal force exerted by the wrap spring on the two inner cylindrical surfaces which is sufficient to "unlock" the first and second inner cylindrical surfaces from each other and permitted relative rotation between the two surfaces. The input hub can therefore rotate under the inertia of the driven device via the shaft while the pulley sheave can rotate under the influence of the input member or belt.

Relative rotation in this manner reduces or eliminates relative slipping between the belt and the pulley and, importantly, associated squeal and premature wear problems.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figures 1, 2, 3:
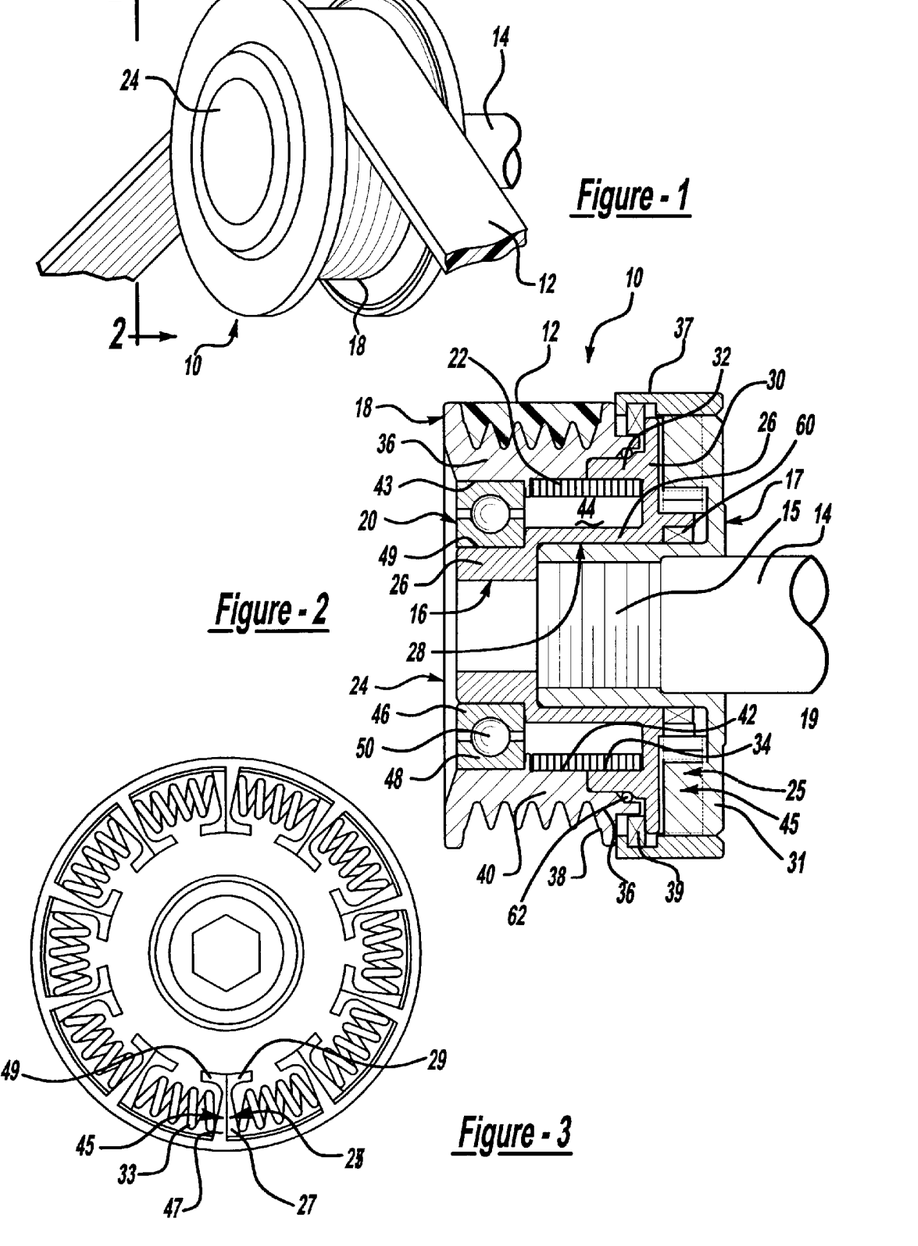
FIG. 1 is a perspective view of a one-way, over-running clutch pulley embodying the principles of the present invention.
FIG. 2 is a sectional view taken substantially along line 2—2 in FIG. 1 illustrating in detail the construction of the clutch pulley of the present invention.
FIGS. 3, 4 and 5 are sectional views taken substantially along line A—A in FIG. 2 illustrating the shelf projections of both the input and output hubs, and the compression springs between the hubs in various states of compression.

Referring now in detail to the drawings, there is shown in FIGS. 1, 2, and 3 a one-way, over-running clutch pulley according to the principles of the present invention. The clutch pulley, generally designated at 10, has six principal components and two minor components. These include an input hub 16, output hub 17, a pulley sheave 18, a bearing 20, a wrap spring 22, compression springs 33, roller/journal bearing 60 and a seal 62.

While shown in a generic application where a belt 12 provides a rotational input to the clutch pulley 10 and a shaft 14 delivers the rotational output from the clutch pulley 10, numerous specific applications can be envisioned where the clutch pulley 10 of the present invention would have applicability. For example, the belt 12 could be the ribbed serpentine belt of a motor vehicle accessory drive system and the shaft 14 could be the input shaft into an alternator used to provide power to the various electrical systems of the vehicle during its operation. It is in this particular application that the present invention will be described. However, it is not intended for the scope of the present invention specifically to be solely limited to motor vehicle applications. By way of illustration and not further limitation, an additional application in which the clutch pulley 10 of the present invention could be utilized includes wave power generation or any situation where a use of a one-way clutch is necessitated.

Referring now to FIG. 2, the input hub 16 includes a first cylindrical portion 26 through which a bore 28 is centrally defined. The inner diameter of the bore 28 approximates the diameter and shape of the outer diameter of a cylindrical portion 19 of the output hub 17 and is intended to receive the cylinder portion 19 therein. To retain the clutch pulley 10 on the shaft 14, the outboard end of the shaft 14 is equipped with threads 15 which engage threads in the cylindrical portion 19. Obviously, other mechanisms can be used to retain the clutch pulley 10 to the shaft 14. A dust end cap or seal 24, seen in FIG. 1, is mounted on the end of input hub 16.

Formed on the inboard end of the first cylindrical portion 26 is a radially extending flange 30. The flange 30 terminates in an axial extension 32 which is coaxial with the bore 28 and defines an inner cylindrical surface 34, the purpose of which will be more fully understood from the discussion which follows.

The pulley sheave 18 is located generally exteriorly about the input hub 16 and is rotatably supported thereon by the bearing 20. The bearing 20 is illustrated as a rolling element bearing whose inner race 46 is mounted onto an exterior surface or seat 49 of the first portion 26 of the input hub 16. The outer race 48 of the bearing 20 is similarly mounted to an inner surface or seat 43 on a first portion 36 of the pulley sheave 18. The rolling element 50, which is illustrated as a ball bearing, is located between the inner and outer races 46 and 48. While not shown, the bearing 20 is permanently sealed so that additional lubrication over its useful life is not necessary. Obviously, other varieties of bearings 20, journal bearings for example, could be used in the present invention.

A grooved recess 38 is defined in the exterior of the first portion 36 of the pulley sheave 18 and is intended to receive the ribbed belt 12 therein. Extending radially inward from the first portion 36 is a radial flange 40. Outboard of the flange 40 is the seat 43 mentioned above, axially inboard of the flange 40 is an inner cylindrical surface 42 defining an inner radial face. The inner cylindrical surface 42 is located to be adjacent to the inner cylindrical surface 34 of the input hub 16 and has a diameter which is substantially the same. In this manner, the inner cylindrical surfaces 34 and 42 cooperate to define a composite cylindrical surface. As used in this context, the term composite surface is referring to both of the inner cylindrical surfaces 34 and 42 in conjunction with one another.

While not illustrated, the inner cylindrical surfaces 34 and 42 can be provided as metal, such as steel, inserts. The inserts can be overmolded into the first portion 36 of the sheave 18 or 32 of the input hub 16, which can be made of an injection molded plastic, and thus provide the sheave 18 and input hub 16 with a composite construction. The inserts would preferably be provided with knurled or otherwise roughened outer surfaces to provide for good bonding to the overmolded plastic. Such inserts would provide hardened inner cylindrical surfaces 34 and 42, for contacting the wrap spring 22.

The wrap spring 22 is located within a spring receiving cavity 44 defined between the composite surface 34, 42 and the first cylindrical portion 26. The wrap spring 22 is a coil spring that in its uncompressed or free standing condition, has a diameter which is slightly greater than the diameter of the composite cylindrical surface 34, 42. When received in the cavity 44, the wrap spring 22 frictionally engages with and exerts a radially outward normal force on both of the inner cylindrical surfaces 34 and 42. Generally speaking, during over-running, the wrap spring 22 will slip on the inner surfaces of the hub 16 or sheave 18. During engagement, the effective diameter of the wrap spring 22 increases causing it to bind on the inner surface of the hub 16 and sheave 18.

Figures 5, 6:
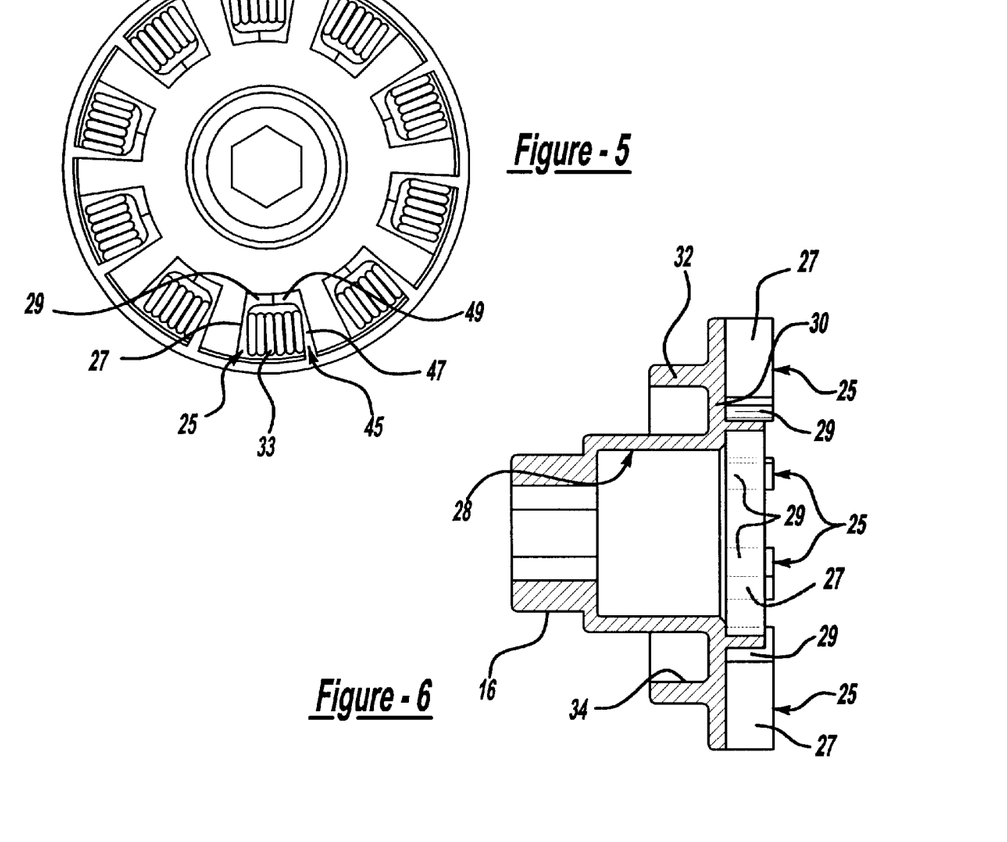
FIG. 6 is a sectional view through the input hub in FIG. 2.
Figures 7, 8, 9:
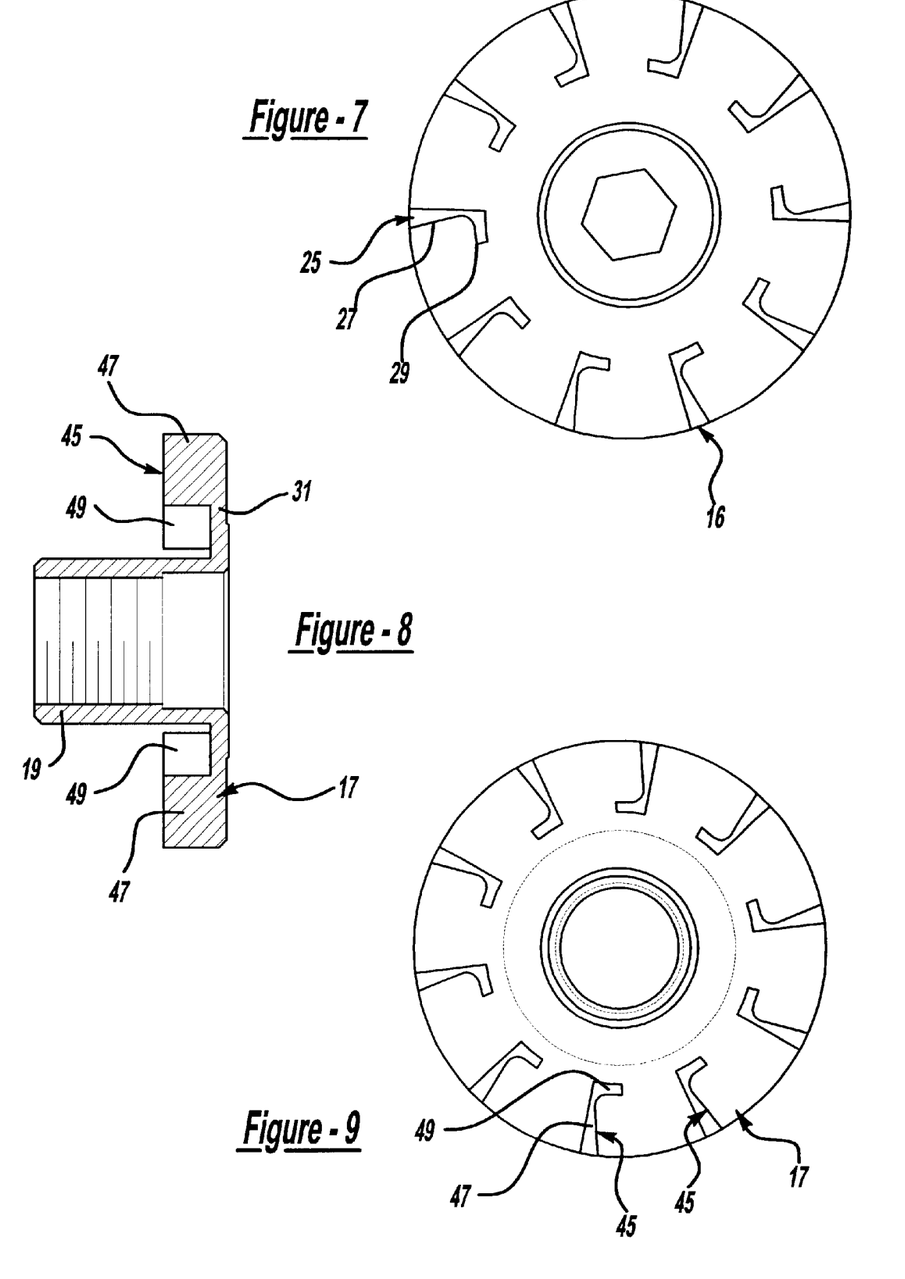
FIG. 7 is a right end view of the input hub of FIG. 6.
FIG. 8 is a sectional view through the output hub in FIG. 2.
FIG. 9 is a left end view of the output hub seen in FIG. 8.

FIG. 6 is a sectional view similar to FIG. 2, but showing only the input hub 16. FIG. 7 also shows the input hub 16. The view of FIG. 7 is from the right side of the input hub 16 of FIG. 6. FIG. 9 is a view similar to FIG. 6, but of the output hub 17. The view of FIG. 8 is from the left side of the output hub 17 of FIG. 9.

The input hub 16 and the output hub 17 each include a series of projections or shelves 25 and 45, respectively, that cooperate with one another as further discussed below. The shelves 25 and 45 are made up of a radial portion 27 and 47, respectively, and a circumferential portion 29 and 49, respectively.

Figure 4:
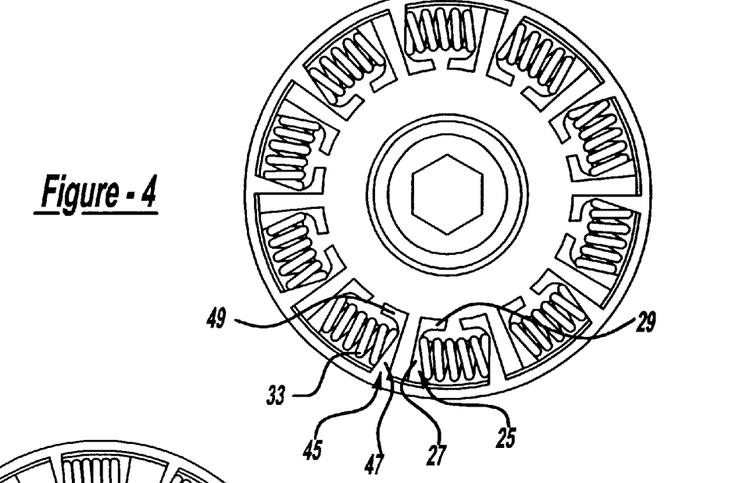

Referring to FIGS. 3–5, when the hubs 16 and 17 are mounted together, the shelves 25 and 45 are seen as being provided in pairs and as mirror images of one another. For reference it is noted that FIGS. 3–5 are views generally taken along line A—A in FIG.

The shelves 25 and 45 are positioned on the input and output hubs 16 and 17 generally adjacent to the perimeter of the respective radial flanges 30 and 31 of the input and output hubs 16 and 17. Accordingly, when assembled together the shelves 25 and 45 face each other with their circumferential portions 29 and 49 projecting toward one another and with a compression spring 33 captured therebetween. An outer ring 37 is unitarily formed with or is welded to the outer diameter of the output hub 17 and a retainer clip 39 holds or biases the outer ring 37 and input hub 16 together to prevent the assembly from falling apart before installation. Other retention devices, however, can be utilized. Additional seals, other than seal 62, have not been shown in the drawings but may be included.

In a zero or negative driven torque condition, the compression springs 33 are substantially fully extended and bias the shelves 25 and 45 apart so as to back the radial portions 27 and 47 against each other, as seen in FIG. 3. As positive torque is beginning to be transmitted from the belt 12 through the clutch pulley 10 to the shaft 14, the springs 33 are compressed, as seen in FIG. 4. Depending on the amount of torque being transmitted, the compression springs 33 will be subjected to forces which can compress them partially, as seen in FIG. 4, or substantially completely, as seen in FIG. 5. In this latter state the circumferential portions 29 and 49 of the shelves 25 and 45 make contact or bottom out, preventing overcompression of the compression springs 33. In this condition, input hub 16 and output hub 17 are hard-locked in the drive direction. By locating the compression springs 33 between the shelves 25 and 45, energy during transient torque or resonant conditions is absorbed and compliance in the over-running clutch assembly is created, thereby softening the transition between the "unlocked" state and the "locked" state of the clutch pulley 10.

During operation, the clutch pulley 10 is driven by the belt 12 which may in turn be driven by the crankshaft pulley (not shown) of an I.C. engine (not shown). Rotation of the belt 12 therefore causes a corresponding rotation of the pulley sheave 18. If the pulley sheave 18 is accelerated relative to the input hub 16, the clutch pulley 10 of the present invention will transfer torque from the pulley sheave 18 first to the input hub 16 then to the output hub 17 and subsequently to the shaft 14 where it can be used to drive the armature (not shown) of an alternator (not shown). When the pulley sheave 18 is significantly decelerated relative to the rotational speed of the input hub 16, the clutch pulley 10 of the present invention allows for the input hub 16 to over-run or slip relative to the pulley sheave 18 as the inertia from the armature of the alternator prevents the input hub 16 from decelerating as fast as the pulley sheave 18. Previously, where no slip occurred in the pulley itself, the deceleration of the belt and the inertial over-running of the pulley caused the belt to squeal as it slipped relative to the pulley. Not only was this squeal annoying, but it has been seen that the slippage also created additional wear on the belt.

In the present invention, torque is transferred and slip is permitted because of the wrap spring 22 and the specific clutch pulley 10 construction. To provide these complementary functions, the wrap spring 22 is oriented in the cavity 44 so that it is "wound" or coiled in a direction which fosters the transferring torque and the providing of slip. The coiling of the wrap spring 22 is such that when the pulley sheave 18 is positively driving or accelerating relative to the input hub 16, the frictional engagement of the wrap spring 22 with the inner cylindrical surface 42 of the pulley sheave 18 will cause the spring to experience compressive loading or unwinding. During compressive loading, the compression spring 33 is compressed, as the shelves 25 and 45 are moved toward each other, and extra torque is required to compress the spring 33, creating compliance in the system. By absorbing energy in a transient torque condition, the compression springs 33 enable the input hub 16 and output hub 17 to more gradually transfer torque to the shaft 14. This softening the "lock-up" of the clutch 10 and eliminating abrupt transition between the "unlocked" and "locked" states. As the compression spring 33 is compressed, the input hub 16 is permitted to rotate relative to the output hub 17 in a limited amount. Preferably 3–60° of relative rotation or compliancy occurs between the input hub 16 and the output hub 17 before complete lock-up, although more or less compliance can be provided if required by other design criteria. The extra torque required to compress the springs 33 in the input hub 16 and output hub 17 coupling creates the compliance of the system.

As the wrap spring 22 is unwound, its freestanding outer diameter would effectively increase if it were not restrained by the inner cylindrical surfaces 34 and 42. The frictional forces between the inner cylindrical surfaces 34 and 42 and the coils or volutes of the spring 22 results in an increased compressive forces being built-up in the spring 22 along the helix of the spring thereby increasing the radially outward normal force being exerted on both the inner cylindrical surfaces 34 and 42 of the pulley sheave 18 and input hub 16. As a normal force continues to increase, the multiplicitive effect along the spring 22 causes the pulley sheave 18 to lock to the input hub 16 fostering the transfer of torque from the belt 12 to the shaft 14. Additionally, by having the wrap spring 22 engage inner cylindrical surfaces 34 and 42 of the pulley sheave 18 and hub 16, centrifugal forces induced by rotation of the clutch pulley 10 are utilized to further enhance and increase the radially outward normal force exerted by the wrap spring 22. One additional benefit of this engagement between the exterior of the wrap spring 22 and the interior cylindrical surfaces 34 and 42 is that any lubricants used with the wrap spring 22 are retained on the spring 22 and inner cylindrical surfaces 34 and 42 under the influences of the centrifugal forces and are not drawn away.

When the speed of the belt 12 is reduced, the inertia acting on the shaft 14 causes the input hub 16 to over-run the pulley sheave 18. The coiling direction of the wrap spring 22 causes the effective outer diameter of the spring 22 to slightly reduce as the wrap spring 22 "winds-up". Corresponding with this reduction in the effective outer diameter of the wrap spring 22, the frictional forces between the inner cylindrical surfaces 34 and 42 and the coils of the wrap spring 22 are reduced as a result in a decrease of the compressive forces along the helix of the wrap spring 22 and the decrease in the radially outward normal force exerted by the wrap spring 22 on the inner cylindrical surfaces 34 and 42. As the wrap springs effective diameter decreases, the volutes of the wrap spring 22 disengage from the inner cylindrical surfaces 34 and 42. This "unlocks" the inner cylindrical surfaces 34 and 42 from each other and the input hub 16 is permitted to overrun and rotate relative to the pulley hub 18.

Figure 10:
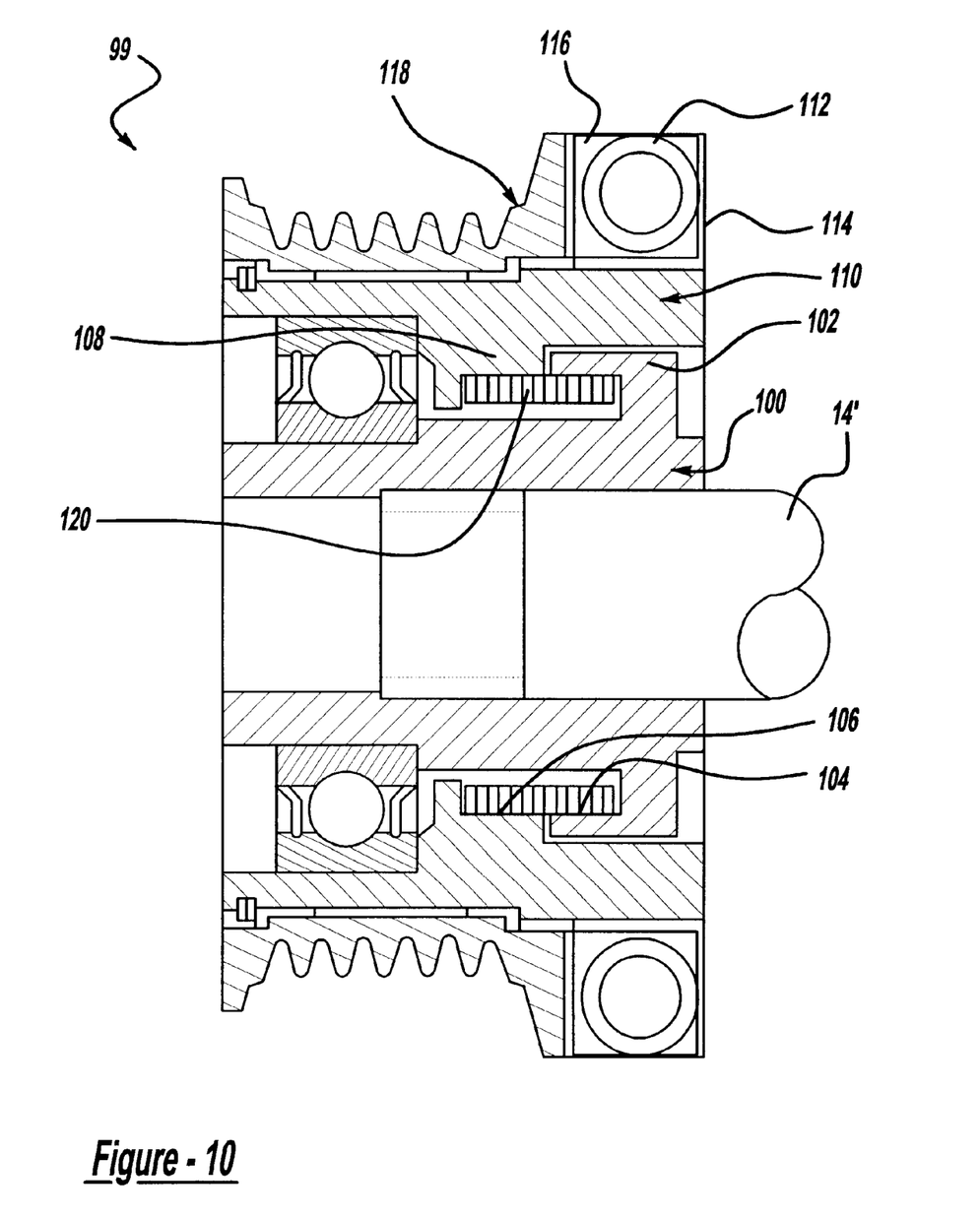
FIG. 10 is an alternative embodiment of the present invention.

It should be noted that while a specific embodiment of the one-way over-running clutch 10 has been detailed in the description, any type of one way over-running clutch could be employed by the present invention in conjunction with the shelf and spring assembly coupling the input hub 16 and output hub 17. An alternative embodiment of the present invention is seen in FIG. 10. If the pulley 99 was used in a driving, instead of driven, application, the locations of the compliant and over-running features would be switched. As shown in FIG. 10, an inner hub 100 attached to the shaft 14' (now the driving, input shaft) includes a portion 102 defining an inner cylindrical surface 104, while the second inner cylindrical surface 106 is defined on a portion 108 of an intermediate output hub 110. A one-way clutch wrap spring 120 extends across the inner cylindrical surfaces 104 and 106 as previously discussed. Compressive springs 112 are located between the "shelves" 114 and 116, respectively formed as part of the intermediate hub 110 and a pulley sheave 118. The remaining features of the pulley 99 are similar to the prior embodiment. Reference is herein made to the prior discussions of such other features.

While the above description constitutes the preferred embodiment of the present invention, it will be appreciated that the invention is susceptible to modification, variation and change without departing from the proper scope and fair meaning of the accompanying claims.

What is claimed is:

1. An over-running clutch pulley for mounting to a rotational input shaft of a device, said clutch pulley being driven by a rotational input member adapted to cause rotation of said clutch pulley, said clutch pulley comprising:

a first hub having a cylindrical extension defining a first inner surface of a first diameter;

a sheave having a first portion to engage the input member and cause rotation of said sheave, said sheave including a second inner surface having a diameter substantially the same as said first inner surface and being coaxial therewith, said first and second inner surfaces being located adjacent to one another and cooperating to define a composite inner surface;

a bearing located between said sheave and at least one of said first hub and permitting relative rotation therebetween;

a spring having a free standing outer diameter greater than said first diameter, said spring frictionally engaging said composite inner surface such that said spring is retained in engagement therewith by a radially outward normal force inherently exerted by said spring, said spring oriented in a direction such that positive driving of said sheave relative to said first hub causes an increased outward normal force to be exerted against said composite inner surface whereby said sheave and said first hub are prevented from rotating relative to one another and torque is transferred from said input member to said first hub, said orientation of said spring also being such that deceleration of said sheave relative to said hub causes a decreased outward normal force to be exerted by said spring on said composite inner surface thereby permitting said sheave and said first hub to rotate relative to one another and allowing said first hub to overrun said sheave; and a second hub having a portion defining a bore of a diameter to receive the input shaft and mount thereon, said second hub being moveably coupled to said first hub for limited relative rotation therebetween; and a resilient member mounted between said first hub and said second hub, said resilient member providing a force in opposition to relative movement between said first hub and said second hub.

2. An over-running clutch pulley as set forth in claim 1, wherein said first hub includes a first projection and said second hub includes a second projection, said resilient member located between said first and second projections.

3. An over-running clutch pulley as set forth in claim 2, comprising a plurality of said first and second projections and a plurality of resilient members, one of said resilient members located between paired ones of said first and second projections.

4. An over-running clutch pulley as set forth in claim 3, wherein said paired ones of said first and second projections are biased apart by said resilient members when said over-running clutch pulley is not being driven by the rotational input member.

5. An over-running clutch pulley as set forth in claim 3 wherein said paired ones of said first and second projections are biased together against said force of said resilient member when said overrunning clutch pulley is driven by the rotational input member.

6. An over-running clutch pulley as set forth in claim 3, wherein at least one of said first and second projections includes a stop limiting compression of said resilient member.

7. An over-running clutch pulley for mounting to a rotational input shaft, said clutch pulley being driven by said input shaft to cause rotation of said clutch pulley and an output member, said clutch pulley comprising:

- a hub including a first hub portion and a second hub portion, said second hub portion having a bore of a diameter to receive said input shaft and mount said hub thereon;
- a sheave having a first portion for engaging said output member;
- a bearing located between said first and second hub portions and permitting relative rotation therebetween;
- a one-way clutch mechanism located between said first and second hub portions, said one-way clutch mechanism being such that positive driving of said second hub portion relative to said first hub portion causes said one-way clutch mechanism to lock-up whereby said first and second hub portions are prevented from rotating relative to one another and torque is transferred from said input shaft to said output member, said one-way clutch mechanism also being such that deceleration of said second hub portion relative to said first hub portion causes said one-way clutch mechanism to unlock thereby permitting said first and second hub portions to rotate relative to one another and allowing said first hub portion to overrun said second hub portion; and
- compliancy means for permitting limited relative rotation between said first hub portion and said sheave during initial positive driving of said second hub portion relative to said first hub portion.

8. An over-running clutch pulley as set forth in claim 7, wherein compliancy means includes a resilient member providing a force in opposition to relative movement between said first hub portion and said sheave.

9. An over-running clutch pulley as set forth in claim 7, wherein said compliancy means includes a first projection on said first hub portion, a second projection on said sheave and a resilient member located between and engaging said first and second projections.

10. An over-running clutch pulley as set forth in claim 7, wherein said compliancy means includes a plurality of first projections on said first hub, a plurality of second projections on said sheave and a plurality of resilient members, one of said resilient members located between paired ones of said first and second projections.

11. An over-running clutch pulley as set forth in claim 10, wherein said paired ones of said first and second projections are biased apart by said resilient members when said over-running clutch pulley is not being driven by the input shaft.

12. An over-running clutch pulley as set forth in claim 10, wherein said paired ones of said first and second projections are biased together against said force of said resilient member when said overrunning clutch pulley is driven by the input shaft.

13. An over-running clutch pulley as set forth in claim 10, wherein at least one of said first and second projections includes a stop limiting compression of said resilient member.

14. An over-running clutch pulley as set forth in claim 7, wherein said one-way clutch mechanism includes a wrap spring engaging surfaces on both said sheave and said first hub portion.

\* \* \* \* \*